United States Patent [19]

Seager

[11] 4,071,219
[45] Jan. 31, 1978

[54] FISHING ROD SUPPORT DEVICE
[75] Inventor: Reuben Seager, Myerstown, Pa.
[73] Assignee: Raymond Lee Organization, New York, N.Y.
[21] Appl. No.: 755,472
[22] Filed: Dec. 30, 1976
[51] Int. Cl.² .............................................. A47C 7/62
[52] U.S. Cl. .................................... 248/534; 297/188; 297/192
[58] Field of Search .......................... 43/21.2; 248/534; 297/188, 192

[56] References Cited
U.S. PATENT DOCUMENTS

| | | | |
|---|---|---|---|
| 1,891,163 | 12/1932 | Kabele | 248/534 X |
| 2,852,218 | 9/1958 | Stires | 248/534 X |
| 2,909,215 | 10/1959 | Mitchell | 297/188 X |
| 3,143,374 | 8/1964 | Carboni | 297/188 |

Primary Examiner—James C. Mitchell
Attorney, Agent, or Firm—Stephen Wyden

[57] ABSTRACT

A rod support member pivots in the slot of the extension while a rear support member slides on the extension, the extension slides for and aft in a larger extension, the larger extension is received in a support member which laterally slides depending from a pair of shafts mounted on a set of rods connected to a set of bars hooked on to the seat of a folding lawn chair. The carriage hangs beneath the seat of the chair.

5 Claims, 4 Drawing Figures

FISHING ROD SUPPORT DEVICE

I have invented a new and novel fishing rod support device. My device will permit a person to fish while sitting in an easy chair and to move his rod to either side of the chair further away or closer to him, and will eliminate the need for the user to hold the fishing rod while waiting for a fish to bite.

My invention can be understood in view of the accompanying figures.

Figure 1:
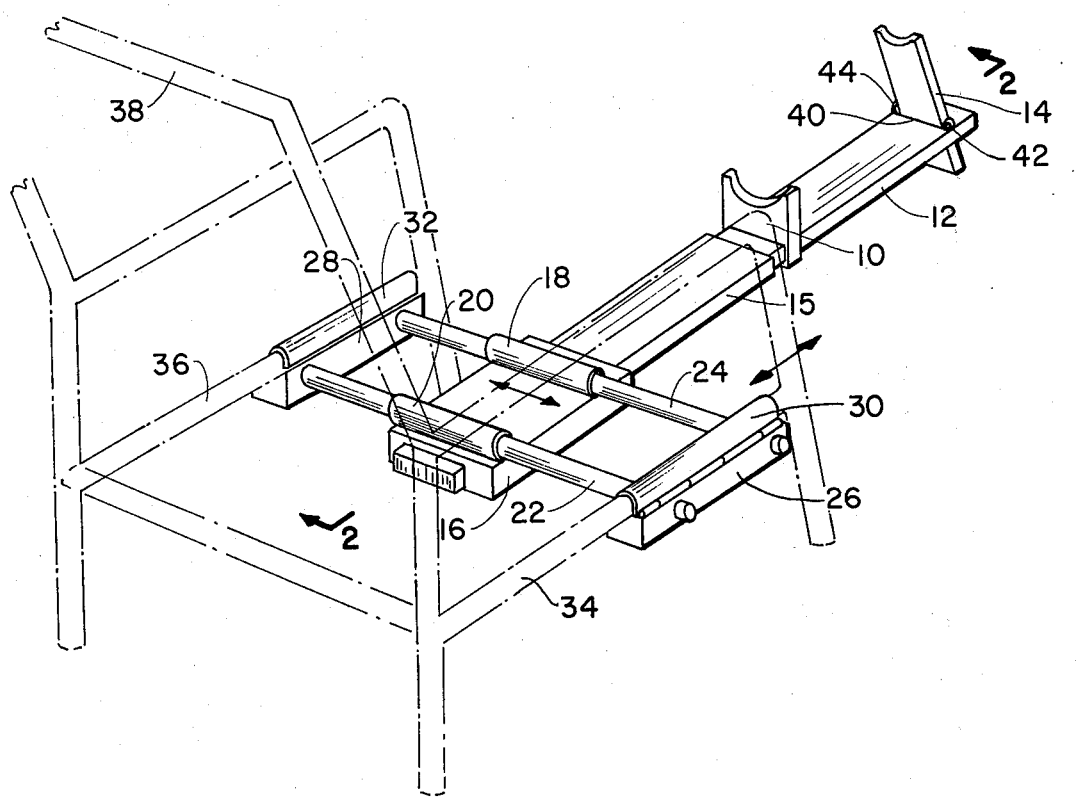
FIG. 1 is a rear perspective view of the device mounted on an arm chair.
Figure 2:
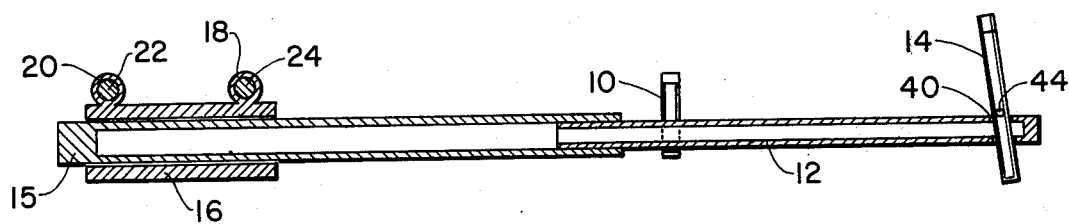
FIG. 2 is a cross section of the device taken along the plane 2—2 of FIG. 1.

In FIGS. 1 and 2, a support member 10 can support a fishing reel. The reel supporting member 10 is mounted on extension 12 to which is attached a rod supporting member 14. Extension 12 is slidingly mounted in member 15 which in turn is mounted slidingly in member 16. Member 16 depends from cylindrical supports 18 and 20 which laterally slide on rods 22 and 24 and are attached to bars 26 and 28 which are attached by hooks, 30 and 32, to the lower rungs 34 and 36 of a chair 38. Slot 40 in extension 12 permits pivoting of rod support member 14 supported by shafts 42 and 44.

Figure 3:
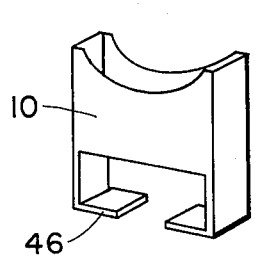
FIG. 3 is a close up perspective view of the reel supporting member of the device.

With regard to FIG. 3, the concave upper surface reel support member 10 is seen to form a clip 46 at a bottom portion of the member for sliding the member on the extension 12.

Figure 4:
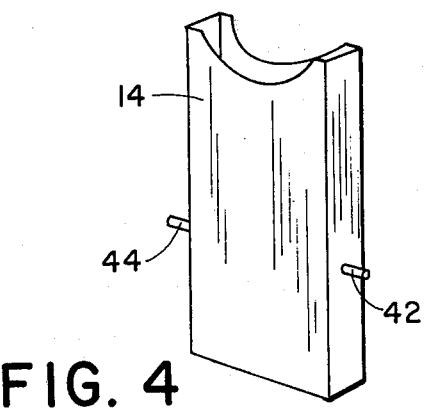
FIG. 4 is a close up perspective view of the rod supporting member of the device.

In FIG. 4, the concave upper surfaced rod support member 14 is seen to form laterally extending shafts 42 and 44 to prevent the rod supporting member 14 from falling through the extension 12.

The device can also be attached to a folding lawn chair. In particular hangers 30 and 32 can be used to hook the invention over the sides of the seat of the chair. One of the hangers can be spring loaded and the other can be rigid. If the seat is fabric covered, a shim can be used to absorb the slack from a person sitting on the fabric. Having described a preferred embodiment of my invention, it is understood that various changes can be made without departing from the spirit of my invention, and I desire to cover by the appended claims all such modifications as fall within the true spirit and scope of my invention.

What I claim and seek to secure by Letters Patent is:

1. A fishing rod support device, comprising:
   an extension,
   a reel support member slidingly attached to the extension,
   a rod support member passing through and pivotally supported on a distal end of the extension,
   the extension slidingly received in a proximal larger member,
   said larger member slidingly received in another member, whereby the largest member may move forward and backward in the other member,
   the other member depending from a pair of cylindrical supports laterally slidingly supported on a pair of laterally extending rods,
   the laterally extending rods mounted to a set of bars at their extremities, and
   means of hookably dependably supporting the bars from the seat of a folding chair.

2. The reel support member of claim 1, further comprising:
   the reel support member forming a concave upper surface for maintaining and supporting a reel, and
   the reel support member forming at a lower end a clip for sliding the reel suport member on the extension.

3. The rod support member of claim 1, further comprising:
   the rod support member forming an upper concave surface for retention of a rod, and
   the laterally extending shaft attached to a side of the member for pivotal retention in the extension.

4. The device of claim 1, wherein the means of hookably supporting the bars comprises:
   a rigid hanger attached to one end of the bars, and
   a spring loaded hanger attached to the other end bar.

5. The device of claim 4, further comprising a skim removably attached to one of the hangers, whereby the device may be attached to a fabric covered seat.

* * * * *